United States Patent
Francis et al.

(10) Patent No.: US 11,721,012 B2
(45) Date of Patent: Aug. 8, 2023

(54) SYSTEMS AND METHODS FOR DAMAGE DETECTION

(71) Applicant: Belron International Limited, Egham (GB)

(72) Inventors: Kelly Francis, Reading (GB); Christopher Davies, Kidwelly (GB)

(73) Assignee: Belron International Limited, Egham (GB)

( * ) Notice: Subject to any disclaimer, the term of this patent is extended or adjusted under 35 U.S.C. 154(b) by 0 days.

(21) Appl. No.: 17/591,458

(22) Filed: Feb. 2, 2022

(65) Prior Publication Data

US 2022/0301149 A1 Sep. 22, 2022

Related U.S. Application Data

(63) Continuation of application No. 16/483,356, filed as application No. PCT/GB2018/050271 on Jan. 31, 2018, now Pat. No. 11,348,220.

(51) Int. Cl.
*G06T 7/00* (2017.01)
*G01N 21/958* (2006.01)
(Continued)

(52) U.S. Cl.
CPC ......... *G06T 7/0004* (2013.01); *G01N 21/958* (2013.01); *G01N 27/20* (2013.01);
(Continued)

(58) Field of Classification Search
CPC .. G06T 7/0004; G01N 21/598; G01N 29/041; G01N 29/12; G01S 19/01; H04N 5/232; H04N 5/2256
See application file for complete search history.

(56) References Cited

U.S. PATENT DOCUMENTS

| | | |
|---|---|---|
| 4,565,919 A | 1/1986 | Bitter et al. |
| 4,808,799 A | 2/1989 | Schave |

(Continued)

FOREIGN PATENT DOCUMENTS

| | | |
|---|---|---|
| CN | 101934778 A | 1/2011 |
| CN | 102874212 A | 1/2013 |

(Continued)

OTHER PUBLICATIONS

Search Report dated Aug. 1, 2017 of Application No. GB1701924.1.

(Continued)

*Primary Examiner* — Myron Wyche
(74) *Attorney, Agent, or Firm* — Gordon & Jacobson, P.C.

(57) ABSTRACT

A system for detecting damage to a glass surface particularly vehicle glazing panels such as vehicle windscreens. The system uses a sensor unit disposed proximate the surface and a processor in communication with the sensor unit. The processor is configured to analyse data received from the sensor unit in order to determine the integrity of the surface and a communication unit is configured to output a signal in response to the processor determining that the surface has been damaged. For vehicle glass the system is preferably integrated into the vehicle management and control systems such that the system is active when the vehicle is active or moving. The management and or control system may monitor for instances or situations when changes, such as above threshold changes, occur in order to produce an output warning signal.

18 Claims, 2 Drawing Sheets

(51) Int. Cl.
*G01N 27/20* (2006.01)
*G01N 29/04* (2006.01)
*G01N 29/12* (2006.01)
*G01S 19/01* (2010.01)
*H04N 23/56* (2023.01)
*H04N 23/60* (2023.01)
*B60J 1/00* (2006.01)

(52) U.S. Cl.
CPC ........... *G01N 29/041* (2013.01); *G01N 29/12* (2013.01); *G01S 19/01* (2013.01); *H04N 23/56* (2023.01); *H04N 23/60* (2023.01); *B60J 1/001* (2013.01); *G01N 2021/9586* (2013.01); *G01N 2291/014* (2013.01); *G01N 2291/0232* (2013.01); *G01N 2291/101* (2013.01); *G01N 2291/263* (2013.01); *G06T 2207/30108* (2013.01)

(56) References Cited

U.S. PATENT DOCUMENTS

| | | | |
|---|---|---|---|
| 4,829,163 | A | 5/1989 | Rausch et al. |
| 5,192,931 | A | 3/1993 | Smith et al. |
| 5,266,873 | A | 11/1993 | Arditti et al. |
| 5,510,767 | A | 4/1996 | Smith |
| 5,539,289 | A | 7/1996 | Wiget |
| 5,804,719 | A | 9/1998 | Didelot et al. |
| 6,115,118 | A | 9/2000 | Dunnegan et al. |
| 6,535,126 | B2 | 3/2003 | Lin et al. |
| 7,650,028 | B1 | 1/2010 | Burns et al. |
| 11,348,220 | B2 * | 5/2022 | Francis ............... G01N 29/041 |
| 2004/0233421 | A1 | 11/2004 | Weinhold |
| 2007/0165213 | A1 | 7/2007 | Fang et al. |
| 2010/0321172 | A1 | 12/2010 | Suzuki et al. |
| 2011/0157581 | A1 | 6/2011 | Davies |
| 2013/0233080 | A1 | 9/2013 | Nikolovski |
| 2014/0201022 | A1 | 7/2014 | Balzer |
| 2014/0247357 | A1 | 9/2014 | Sekiguchi |
| 2014/0285332 | A1 | 9/2014 | Delong |
| 2014/0309805 | A1 | 10/2014 | Ricci |
| 2016/0061625 | A1 | 3/2016 | Wang |
| 2016/0137167 | A1 | 5/2016 | Trevett |
| 2016/0241818 | A1 | 8/2016 | Palanisamy et al. |
| 2020/0013160 | A1 | 1/2020 | Francis et al. |

FOREIGN PATENT DOCUMENTS

| | | |
|---|---|---|
| CN | 105292049 A | 2/2016 |
| CN | 106080516 A | 11/2016 |
| DE | 19521194 A1 | 12/1996 |
| DE | 10159006 A1 | 6/2003 |
| DE | 102005012290 A1 | 9/2006 |
| DE | 102007003023 A1 | 7/2008 |
| DE | 102011009813 A1 | 8/2012 |
| DE | 102013007015 A1 | 10/2014 |
| DE | 102014224127 A1 | 6/2016 |
| EP | 0325145 A1 | 7/1989 |
| EP | 0497649 A1 | 8/1992 |
| EP | 0638822 A1 | 2/1995 |
| GB | 2415776 A | 1/2006 |
| GB | 2524388 A | 9/2015 |
| GB | 2526270 A | 11/2015 |
| GB | 2536239 A | 9/2016 |
| JP | S5737048 A | 3/1982 |
| JP | S61150852 A | 7/1986 |
| JP | H07101239 A | 4/1995 |
| JP | H07309128 A | 11/1995 |
| JP | 2002195939 A | 7/2002 |
| JP | 2003247986 A | 9/2003 |
| JP | 2007099173 A | 4/2007 |
| JP | 2007233434 A | 9/2007 |
| JP | 2008077375 A | 4/2008 |
| JP | 2008120137 A | 5/2008 |
| JP | 2008185531 A | 8/2008 |
| JP | 2010287126 A | 12/2010 |
| WO | 2013/081160 A1 | 6/2013 |
| WO | 2015/081934 A1 | 6/2015 |
| WO | 2018/142120 A1 | 8/2018 |

OTHER PUBLICATIONS

Search Report dated Dec. 21, 2017 of Application No. GB1701924.1.
Search Report dated Dec. 22, 2017 of Application No. GB1701924.1.
Search Report dated May 16, 2018 International Application No. PCT/GB2018/050271.
Written Opinion dated May 16, 2018 International Application No. PCT/GB2018/050271.
Office Action of EP Application No. 18704063.9-1015 dated Feb. 11, 2021.
Australian Exam Report dated Dec. 21, 2021 of Application 2018216089.
Chilean Office Action dated Jan. 20, 2022 of Application No. CL201902197.
Chinese Examination Report dated Nov. 10, 2021 of Application No. 201880010323.5.
Great Britain Examination Report dated Jul. 2, 2021 of Application No. GB1910502.2.
Great Britain Examination Report dated Dec. 10, 2021 of Application No. GB1910502.2.
Great Britain Examination Report and Search Report dated Dec. 10, 2021 of Application No. GB2115703.7.
Indonesian Office Action dated Jul. 16, 2021 of Application No. P00201906748.
Russian Office Action dated Feb. 3, 2021 of Application No. 2019126552/11(052068).
Russian Search Report dated Feb. 2, 2021 of Application No. 2019126552/11(052068).
CN Examination Report 2 dated Aug. 2, 2022 of Application No. 201880010323.5.
GB Examination Report dated May 4, 2022 of Application No. GB2115703.7.
GB Examination and Search Report dated Jun. 21, 2022 of Application No. GB2208000.6.
GB Examination and Search Report dated Jun. 21, 2022 of Application No. GB2207999.0.
CN Office Action dated Jan. 12, 2023 of Application No. 201880010323.5.
Extended EP Search Report dated Jan. 13, 2023 of Application No. 22197867.9-120.
MX Office Action dated Dec. 13, 2022 of Application No. MX/2022/163712.
BR Search Report and Written Opinion dated Sep. 9, 2022 of Application No. BR112019015861-8.
GB Exam Report dated Sep. 2, 2022 of application No. GB2207999.0.
MX Exam Report dated Sep. 26, 2022 of Application No. MX/a/2019/009278.

* cited by examiner

SYSTEMS AND METHODS FOR DAMAGE DETECTION

CROSS-REFERENCE TO RELATED APPLICATIONS

This application is a continuation of U.S. patent application Ser. No. 16/483,356 filed on Aug. 2, 2019, which is the National Stage of International Patent Application No. PCT/GB2018/050271 filed on Jan. 31, 2018, which claims priority from British Patent Application No. GB 1701924.1 filed on Feb. 6, 2017, each of which is hereby incorporated by reference herein in its entirety.

BACKGROUND

1. Field

The present invention relates to systems and methods for detecting damage to a glass surface. In particular, the invention provides systems and methods for detecting surface flaws or chips on a window pane, such as a vehicle windscreen.

2. State of the Art

Vehicle windscreens are typically made of a laminate construction comprising two plies (or layers) of glass separated by an interlayer, usually made of a plastics material. A vehicle windscreen can easily become damaged by a flaw or chip on the outer ply. The most common cause of such a chip is a stone or other small projectile impacting the windscreen whilst the vehicle is being driven. Similar damage can also occur to other glass surfaces, such as doors, windows and light covers.

These chips are generally of the order of up to 1 cm in size when initially created, depending on the impact speed and the temperature of the windscreen. A chip of this size in the outer surface of the windscreen can often be repaired without requiring replacement of the windscreen, for example by injecting resin into the damaged area. This depends on many factors, such as the size, depth and location of the damaged area, and local standards regarding windscreen repair.

A surface chip will increase in size after creation if the vehicle continues to be driven, due to direct stress and static fatigue. Drivers often do not notice, or become concerned about a chip until it has substantially increased in size. If left unrepaired a small chip can often turn into a substantial crack in the windscreen which is not repairable, requiring the entire windscreen to be replaced. This process is much more expensive and time consuming than simply repairing the initial chip. It is therefore desirable to identify any chips in a windscreen and ensure that they are repaired as soon as possible after creation.

As small surface chips or flaws in a glass surface can be difficult to identify by eye, there is a need for a system which automatically detects surface chips or flaws in a glass surface. This may be more convenient and efficient that relying on manual detection methods.

SUMMARY

In a first aspect of the present invention there is provided a system for detecting damage to a glass surface, the system comprising:
a sensor unit disposed proximate the surface;
a processor in communication with the sensor unit, wherein the processor is configured to analyse data received from the sensor unit to determine the integrity of the surface; and
a communication unit configured to output a signal in response to the processor determining that the surface has been damaged.

This system provides the advantage that any damage to the surface is automatically detected and communicated to a user, which is faster and more accurate than relying on a user to see the damage and to act on this.

Optionally, the glass surface may be a vehicle windscreen, or a side or rear vehicle window. In some embodiments, the glass surface may comprise toughened, or semi-toughened glass.

For vehicle glass the system is preferably integrated into the vehicle management and control systems such that the system is active when the vehicle is active or moving. The management and or control system may monitor for instances or situations when changes, such as above threshold changes, occur in order to produce an output warning signal.

In some embodiments, the sensor unit may comprise a microphone. The processor may comprise a sound amplification and signal processing system. The sound of a stone or other small projectile impacting the surface will result in a signal output from the microphone which has a particular time response and frequency spectrum. The processor may be programmed to identify a plurality of predetermined signals indicative of damage events. The processor may activate the communication unit when one of these predetermined signals is recorded (i.e. output from the microphone).

Additionally of alternatively, the processor may then activate another component of the sensor unit to perform a secondary or back-up test.

Optionally, the sensor unit may comprise a camera. The camera may be mounted such that it has a complete view of the surface. Optionally, the sensor unit may comprise a controller configured to move, tilt or pivot the camera. The camera may therefore be configured to scan the surface.

The processor may comprise image processing software which analyses the image of the surface received from the camera to identify any possible damage areas, such as a chip.

The camera may be constantly in operation (i.e. continually imaging the surface). Optionally, the camera may be activated periodically. This may advantageously be more energy efficient and conserve the power supply of the camera. For example, when the surface is a vehicle windscreen or other vehicle window, the camera may be automatically activated in response to the ignition starting the vehicle's engine.

Optionally, the processor may be operable to communicate with a vehicle windscreen cleaning system. For example, the processor may be able to instruction the windscreen wipers to clean the windscreen prior to activating the camera. This may reduce the risk of any dirt or debris on the windscreen being mistaken for a damaged area by the image processing software.

In some embodiments, the sensor unit may comprise both a camera and a microphone. The camera may be activated by the processor receiving a predetermined signal from the microphone indicative of a damage event. Thus, the camera may be used to verify or confirm that the windscreen has been damaged, and/or to identify the location of the damaged area. This is advantageous as it improves the accuracy of the detection system, as although the microphone may indicate that an object has impacted the surface, this may not have resulted in any damage. The camera may then prevent a user having to conduct a visual inspection of the surface, which can be inconvenient and time consuming.

Optionally, the communication unit may be configured to output one or more images received from the camera, optionally via a data link.

In some embodiments, the sensor unit may comprise an optical transmitter and an optical detector. The optical transmitter and the optical detector may be disposed in a fixed position, or they may be moveable relative to the surface. For example, the optical transmitter and the optical detector may scan across the surface. The movement of the optical transmitter and/or the optical detector may be controlled by a controller.

The optical transmitter may be configured to at least partially illuminate the surface and the optical detector may be arranged to at least partially receive the light output from the optical transmitter. Thus, the optical detector may record the amount of light reflected by, or transmitted through, the surface.

Optionally, the optical transmitter may be arranged to at least partially illuminate the external surface of a windscreen, and/or the interlayer of a windscreen.

A flaw or chip in the surface will disrupt or attenuate the light output by the optical transmitters. This disruption will be identified by the processor, wherein the processor may then activate the communication unit to output a signal indicating that a damage event has taken place. Additionally of alternatively, the processor may then activate another component of the sensor unit to perform a secondary or back-up test.

Optionally, the sensor unit may comprise an array of optical transmitters. The array of optical transmitters may be configured to output a dispersed light pattern. The angle of incidence of light output by the array of optical transmitters may be selected such that the light undergoes total internal reflection (TIR) through the surface. In embodiments where the surface is a windscreen, the light may undergo TIR along the outer ply, or along the interlayer between the outer and inner plies. For example, the array of optical transmitters may be positioned internally of the windscreen. A flaw in one of the plies will result in increased light leakage through the flaw.

The optical transmitter(s) and optical detector(s) (i.e. the optical system) may operate continuously. Optionally, the optical system may operate periodically. For example, the optical system may operate in combination with the microphone and/or camera. The optical system may therefore verify or confirm the data recorded by the other components of the sensor system.

In some embodiments, the detection system may comprise an electrically conductive film or coating disposed on the surface. The sensor unit may comprise an electric circuit which is operable to measure the electrical resistance of the film. For example, the electric circuit may comprise a voltmeter. The electrical resistance of the coating will change if the surface becomes damaged and this change can be detected by the processor.

Optionally, the film may be disposed on the outer (i.e. external) face of the surface. This makes the film more sensitive to even small flaws or chips in the outer face of the surface, but the lifetime of the film will be decreased as it will degrade faster due to being exposed to external factors such as the weather and the action of windscreen wipers etc. The processor may be configured to instruct the communication unit to output a signal after a predetermined amount of time to warn a user that the film should be replaced.

The conductive film may be used in combination with any other disclosed features of the sensor unit.

In some embodiments, the sensor unit may comprise a transducer configured to output acoustic waves which vibrate the surface and a receiver arranged to measure the vibration of the surface. The transducer and/or the receiver may comprise piezoelectric material. Optionally, the transducer and the receiver may be the same device which outputs pulses of acoustic waves. In some embodiments an array of transducers and receivers may be provided.

When undamaged the surface will vibrate with a specific acoustic signal and temporal profile that can be predetermined (e.g. based on the properties of the surface). When damaged the acoustic signal (or vibration) of the surface will be altered, for example the frequency spectrum may be permanently changed compared to the undamaged signal. These changes will be detected by the processor. The processor may then activate another component of the sensor unit to verify that the surface has been damaged. Additionally or alternatively, the processor may instruct the communication unit to output a signal (e.g. an alert).

The processor may require multiple acoustic (i.e. vibration) signals indicative of a damage event to be recorded over a certain time frame before taking any further action. This may prevent signals or alerts being output due to rain or hail or other objects causing the surface to temporarily vibrate without causing damage.

The acoustic vibration system could be used in combination with any other disclosed features of the sensor unit. This may improve the accuracy and/or reliability of the detection system.

The system may comprise a data storage device. The data storage device may be configured to store data output from one or more of the sensor unit, the processor and/or the communication unit. The data storage device may be removable, for example a memory card or disc.

The communication unit may be configured to output a visual and/or audio alert that a damage event has occurred. Optionally, the communication unit may be operable to output a signal (e.g. an alert) to a remote location. The remote location may be a repair centre which can then automatically schedule the surface to be repaired. This may be advantageous as it eliminates any inconvenience for the user (e.g. driver) and prevents any delay in getting the damage repaired, which can save the user money as a minor repair often becomes a much larger more expensive job if neglected.

The communication unit may comprise a transceiver for outputting the signal, for example an RF transceiver. Optionally, the communication unit may be configured to output a signal via a wireless data link.

Optionally, the communication unit may comprise a GPS transmitter and a GPS receiver. In some embodiments, the communication unit may output an alert to a designated repair centre, regardless of the location of the vehicle. The contact details for the designated repair centre may be programmable by the user. In other embodiments, the communication unit may contact the nearest repair centre to the vehicle, for example if the windscreen has cracked or if the repairs required are significant. Optionally, the communication unit may contact the nearest branch of a designated chain of repair centres.

In some embodiments, the communication system may be in communication with the vehicle alarm system (e.g. the intruder alarm system). For example, if the system detects a crack or a damaged area of the windscreen which exceeds a threshold size or severity then the communication system may activate the vehicle alarm system. Conversely, if the vehicle alarm system is activated due to a window breaking in the vehicle then the communication system may output an alert.

In a second aspect of the present invention, there is provided a method for detecting damage to a glass surface, the method comprising:

- measuring one or more acoustic, electrical, or optical properties of, or proximate to, the surface using a sensor unit;
- analysing data received from the sensor unit using a processor to determine the integrity of the surface;
- outputting a signal from a communication unit in response to the processor determining that the surface has been damaged.

In particular embodiments, the glass surface may be a vehicle windscreen, or a side or rear vehicle window. In some embodiments, the glass surface may comprise toughened, or semi-toughened glass.

The sensor unit may comprise a plurality of sensors. In some embodiments, the method may comprise the step of instructing the sensor unit to verify whether the surface has been damaged by conducting a further measurement using a different sensor.

In some embodiments, the step of measuring one or more properties using a sensor unit may comprise recording the sound of a potential damage event using a microphone, and converting this sound signal into an electrical signal. The method may include identifying whether the electrical signal matches one of a plurality of predetermined signals indicative of damage events.

Optionally, the step of measuring one or more properties of the surface using a sensor may comprise imaging the surface using a camera. The method may also include moving the camera to scan across the surface. The step of analysing data received from the sensor unit may comprise using image processing software to analyse one or more images of the surface to identify any possible damage areas, such as a chip.

Optionally, the method may include cleaning the surface prior to activating the camera.

In some embodiments, the method may include activating the camera in response to the microphone (or other sensor) recording a signal indicative of a potential damage event. Thus, the camera may be used in the verification step.

Optionally, the method may include displaying the signal or alert output by the communication unit.

In some embodiments, the step of measuring one or more properties of the surface using a sensor unit may comprise at least partially illuminating the surface using an optical transmitter and recording the amount of light reflected by, or transmitted through, the surface using an optical detector.

The step of analysing data received from the sensor unit using a processor to determine the integrity of the surface may comprise identifying any disruption or attenuation in the light recorded by the optical detectors.

Optionally, the method may include selecting the angle of incidence of light output by an array of optical transmitters such that the light undergoes total internal reflection between an outer and inner ply (or layer) of glass.

In some embodiments, the method may include activating the optical system in response to the microphone, camera (or other sensor in the sensor unit) recording a signal indicative of a potential damage event. Thus, the optical system may be used in the verification step.

In some embodiments, the method may include disposing an electrically conductive film or coating on the surface. The method may include measuring the electrical resistance of the film and identifying any changes to the electrical resistance of the film.

In some embodiments, the method may include activating the electrical circuit which measured the resistance of the film in response to the microphone, camera, optical system (or other sensor in the sensor unit) recording a signal indicative of a potential damage event. Thus, the conductive film may be used in the verification step.

In some embodiments, the method may comprise measuring the acoustic properties of the surface. For example, the method may include vibrating the surface by outputting acoustic waves from a transducer. The method may also measuring the vibration of the surface using a receiver and detecting any changes to the output acoustic signal, such as to the frequency spectrum, which are indicative of damage to the surface.

Optionally, the method may include repeating the vibration analysis for a given number of times over a given amount of time, so as to confirm that the changes to the acoustic signal are not temporary.

The method may include activating the acoustic vibration system in response to the microphone, camera, optical system, or conductive film (or other sensor in the sensor unit) recording a signal indicative of a potential damage event. Thus, the acoustic vibration system may be used in the verification step.

Optionally, the method may comprise storing data output from one or more of the sensor unit, the processor and/or the communication unit.

Optionally, the method may include outputting a signal (e.g. an alert) via the communication unit to a remote location. The remote location may be a repair centre which can then automatically schedule the surface to be repaired.

The communication unit may comprise a transceiver for outputting the signal, for example an RF transceiver. Optionally, the communication unit may be configured to output a signal via a wireless data link.

Optionally, the method may comprise determining the location of the nearest repair centre, or nearest designated repair centre, and outputting the signal (or alert) to that location.

BRIEF DESCRIPTION OF THE DRAWINGS

Embodiments of the invention will now be described, by way of example, in the accompanying drawings, of which.

DETAILED DESCRIPTION

Figure 1:
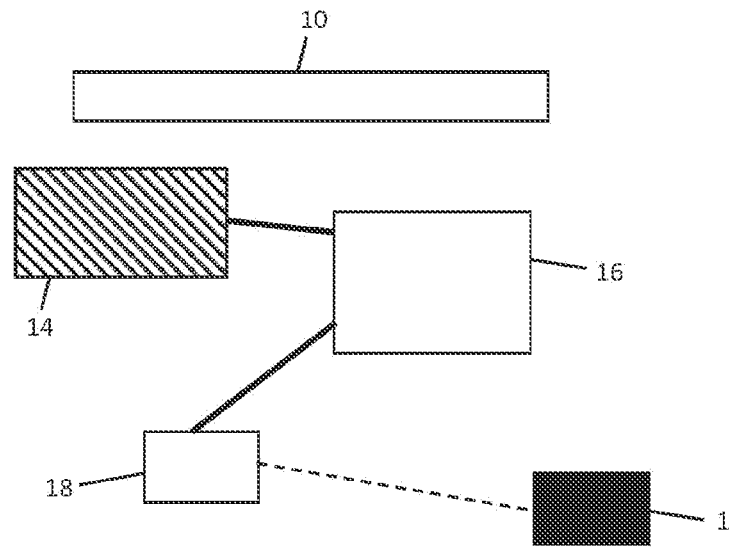
FIG. 1 is a schematic drawing of a detection system according to an embodiment of the invention.

FIG. 1 shows a schematic drawing of a damage detection system of the present invention. The system comprises a sensor unit 14 disposed proximate a glass surface 10. The sensor unit 14 is in communication with a processor 16. The processor 16 is connected to a communication unit 18.

The sensor unit 14 is configured to measure one or more properties or one or more signals indicative of a damage event occurring to the glass surface 10. A damage event includes a flaw or chip forming on the outer face of the surface 10. The processor 16 is configured to analyse data received from the sensor unit 14 and to determine when the surface 10 has been damaged. When a damage event is detected the processor 16 can instruct the communication unit 18 to output a signal, such as an alert, to a remote location 1. The communication unit 18 is in wireless communication with the remote location (e.g. via a data link) shown by the broken line in FIG. 1.

Although the connections between the sensor unit 14, processor 16 and communication unit 18 are shown by solid lines in FIG. 1, these may also be wireless connections.

In some embodiments, the processor 16 may request verification of a damage event from the sensor unit 14 before instructing the communication unit 18.

Figure 2:
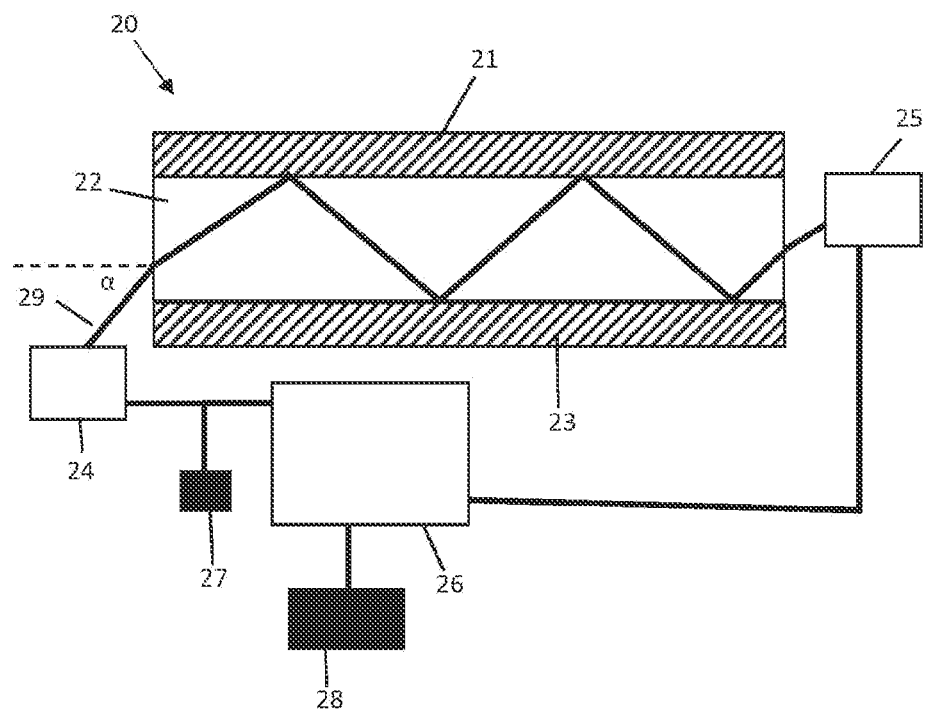
FIG. 2 is a schematic drawing of another embodiment of a detection system including an optical system.

In FIG. 2, the glass surface is a vehicle windscreen 20. The windscreen 20 comprises an outer ply of glass 21 and an inner ply of glass 23 separated by an interlayer 22 comprising a plastics material. The interlayer 22 is generally thinner than the inner 21 and outer 23 glass plies, but the layers are not drawn to scale in FIG. 2 to improve the clarity of the illustration.

The sensor unit in FIG. 2 comprises an array of optical transmitters 24 and an array of optical detectors 25. A controller 27 is in communication with the array of optical transmitters 24 and the processor 26. The processor 26 receives data from the optical transmitters 24 and the optical detectors 25. As in FIG. 1, the processor 26 is connected to a communication unit 28 which is configured to output a signal in response to the processor determining that the windscreen 20 has been damaged.

The optical transmitters 24 are arranged to output dispersed light 29 which undergoes total internal reflection through the interlayer 22 of the of the windscreen. The wavelength of the light emitted 29 may be in the infrared, visible or ultraviolet spectrum. The angle of incidence α of the incident light 29 on the boundary of the interlayer 22 determines whether total internal reflection will occur. The angle α can be adjusted by the controller 27 moving or tilting the optical transmitters 24. In other embodiments, the optical transmitters 24 are fixed in position and there is no controller 27.

The array of optical detectors 25 are positioned to receive light output by the optical transmitters 24. In FIG. 2, the optical detectors are arranged proximate an end of the surface 20 to receive light output from the interlayer 22. If the interface between the interlayer 22 and the outer ply 21 or the inner ply 23 of the windscreen becomes damaged, for example by a chip, then this will disrupt the amount of light received by the detectors 25. This change will be detected by the processor 26 which will then instruct the communication unit 28 to output an alert.

In other embodiments, the array of optical transmitters 24 may be arranged to at least partially illuminate the outer ply 21 of the windscreen. The light emitted 29 may undergo total internal reflection along the outer ply 21. This may allow the optical detectors 25 to detect damage to the external face of the outer ply 21, which does not propagate to the interlayer 22. Optionally, the optical transmitters 24 and/or the optical detectors 25 may be positioned proximate the outer ply 21 (i.e. externally of the windscreen 20). Optionally, the optical transmitters 24 and/or the optical detectors 25 may be positioned proximate to the inner ply 23 (i.e. inside the vehicle).

Figure 3:
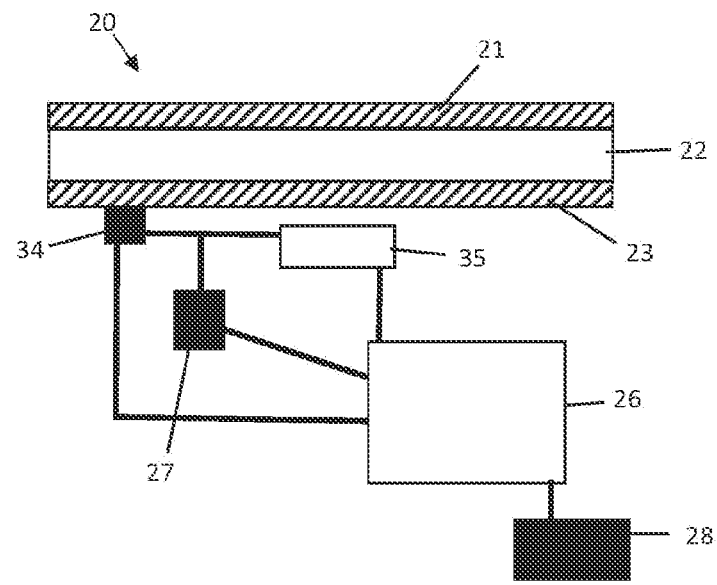
FIG. 3 is a schematic drawing of another embodiment of a detection system including a microphone and a camera.

In FIG. 3, the sensor unit of FIG. 2 has been replaced by a microphone 34 positioned proximate to the windscreen 20 and a camera 35. The microphone 34 is arranged to convert sound signals into electronic signals which are received by the processor 26. The processor 26 includes a signal amplifier and a signal processor. The processor 26 is programmed to analyse whether the signal received from the microphone 34 matches, or approximates a predetermined signal indicative of a damage event. For example, the sound of a stone or other small projectile impacting the outer ply 21 and causing a chip will result in a signal output from the microphone 34 which has a particular time response and frequency spectrum.

There is a risk that the microphone 34 may pick up sounds from inside the vehicle, or of objects striking the outer ply 21 of the windscreen which do not result in any damage but are identified by the processor 26 as damage events. Thus, the camera 35 may be used to verify the results of the microphone 34.

When the processor 26 identifies a possible damage event from the microphone 34 signal, it will activate the camera 35. The camera 35 may be on standby until activated by the processor 26, so as to conserve power. If required, a controller 27 may move, tilt or pivot the microphone 34 and/or the camera 35, such that the camera 35 can image the entire surface 23 of the windscreen. The image, or images, is/are then received by the processor 26 which includes image processing software configured to analyse the image(s) and identify any damage areas on the windscreen 20. As the outer ply 23, interlayer 22 and outer ply 21 are transparent, the camera 35 can be positioned inside of the vehicle and still image any damage areas in the outer ply 21.

If the processor 26 determines that there is a damage area (e.g. a chip) then the processor 26 will instruct the communication unit 28 to output an alert.

Figure 4:
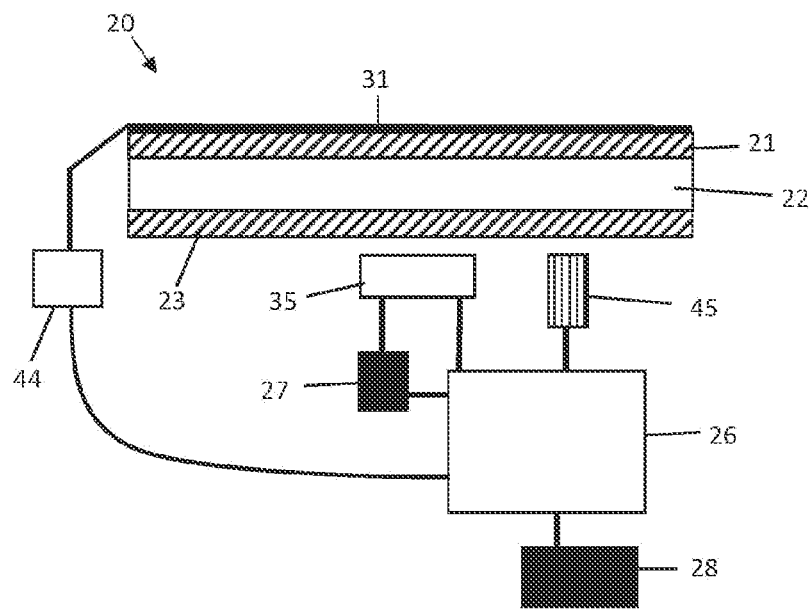
FIG. 4 is a schematic drawing of another embodiment of a detection system including a camera and an acoustic vibration system.

In FIG. 4, an electrically conductive film 31 is disposed on the external face of the outer ply 21 (i.e. the external face of the windscreen 20). The film 31 is connected to an electric circuit 44 operable to measure the electrical resistance of the film 31. In addition to the electric circuit 44 the sensor unit comprises a camera 35 (as in FIG. 3) and an acoustic vibration system 45.

One or more of the features of the sensor unit may be in continuous operation. For example, the conductive film 31 and the acoustic vibration system 45 may be used as the primary detection means.

The processor 26 is configured to compare the electrical resistance of the film 31 (measured by circuit 44) to a predetermined resistance of the film 31 when it is completely intact. The 'undamaged' resistance value may be measured by the circuit 44 when the film 31 is initially applied to the windscreen 20. Any damage to the conductive film 31 (such as a discontinuity) caused by damage to the outer ply 21 of the windscreen will change the electrical resistance of the film 31. If the processor 26 determines that the resistance of the film 31 has changed then it may verify that a damage event has occurred using the camera 35 (as described above) and/or the acoustic vibration system 45.

The acoustic vibration system 45 comprises a transducer configured to output pulses of acoustic waves which vibrate the windscreen 20 and a receiver arranged to measure the vibration of the windscreen 20. In this embodiment the transducer and the receiver are the same piezoelectric device 44, but in other embodiments they can be separate.

When undamaged the windscreen 20 will vibrate with a specific acoustic signal and temporal profile that can be predetermined. When the windscreen 20 is damaged the signal received by the receiver 44 will be permanently altered. The processor 26 analyses the signals recorded by the receiver 44 and detects if the signal has changed from the undamaged signal.

If the processor 26 receives multiple acoustic signals indicative of a damage event in a certain time frame (i.e. that the change was not temporary) then the processor may analyse whether the electrical resistance of the film 31 has changed. If the film 31 verifies that a damage event has occurred then the processor 26 may instruct the communication unit 28 to output an alert.

Alternatively, the processor 26 may seek further verification of damage from the camera 35. The operation of the camera 35 is described above in reference to FIG. 3.

This two-step verification system ensures that the detection of damage to the windscreen is very accurate and reliable compared to known systems.

It will be appreciated that the sensor unit could comprise any combination of the features disclosed in FIGS. 2 to 4, and that systems disclosed as providing verification could equally be used as primary detection means, and vice versa. As such, the sensor unit of the present invention may comprise any one or more of: a microphone 34; a camera 35; an optical system 24, 25; a conductive film 31 and electric circuit 44; and/or an acoustic vibration system 45. For example, the optical system of FIG. 2 could be used in the sensor units of FIG. 3 or FIG. 4, either to provide the initial indication of a damage event, or to verify the diagnosis of one of the other components of the sensor unit.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The mere fact that certain measures are recited in mutually different dependent claims does not indicate that a combination of these measures cannot be used to advantage.

The invention claimed is:

1. A system for detecting damage to a glass surface, the system comprising:
    a sensor unit disposed proximate the surface;
    a processor in communication with the sensor unit, wherein the processor is configured to analyze data received from the sensor unit to determine the integrity of the surface; and
    a communication unit configured to output a signal in response to the processor determining that the surface has been damaged;
    wherein the sensor unit comprises a camera arranged to image the surface and the processor comprises image processing software operable to analyze images received from the camera to identify any damage areas; and
    wherein a controller is configured to move, tilt or pivot the camera.

2. A damage detection system according to claim 1, wherein the sensor unit comprises a microphone and the processor comprises a sound amplification and signal processing system.

3. A damage detection system according to claim 1, wherein the sensor unit comprises an optical transmitter and an optical detector, and wherein the optical transmitter is configured to at least partially illuminate the surface and the optical detector is arranged to at least partially receive light output from the optical transmitter.

4. A damage detection system according to claim 3, wherein the angle of incidence of light output by the optical transmitter(s) is selected such that the light undergoes total internal reflection through the surface.

5. A damage detection system according to claim 1, further comprising an electrically conductive film disposed on the surface.

6. A damage detection system according to claim 5, wherein the sensor unit comprises an electric circuit operable to measure the electrical resistance of the film.

7. A damage detection system according to claim 1, wherein the sensor unit comprises a transducer configured to output acoustic waves which vibrate the surface and a receiver arranged to measure the vibration of the surface.

8. A damage detection system according to claim 7, wherein the transducer and the receiver are the same device which is configured to output pulses of acoustic waves.

9. A damage detection system according to claim 1, wherein the communication unit is configured to output an alert that the surface has been damaged to a remote location.

10. A damage detection system according to claim 9, wherein the communication unit comprises at least one of a transceiver for outputting the signal, a GPS transmitter, and a GPS receiver.

11. A method for detecting damage to a glass surface, the method comprising:
    measuring one or more acoustic, electrical, or optical properties of, or proximate to, the surface using a sensor unit;
    analyzing data received from the sensor unit using a processor to determine the integrity of the surface; and
    outputting a signal from a communication unit in response to the processor determining that the surface has been damaged;
    wherein the sensor unit comprises a plurality of sensors, and the method includes the step of instructing the sensor unit to verify whether the surface has been damaged by conducting a further measurement using a different sensor.

12. A damage detection method according to claim 11, wherein the glass surface is a vehicle windscreen.

13. A damage detection method according to claim 11, wherein the step of measuring one or more properties using the sensor unit comprises recording the sound of a potential damage event using a microphone and converting this sound signal into an electrical signal.

14. A damage detection method according to claim 11, wherein the step of measuring one or more properties using the sensor unit comprises imaging the surface using a camera; wherein the method includes moving the camera to scan across the surface.

15. A damage detection method according to claim 11, wherein the method includes verifying that a damage event has occurred by activating a camera in response to a microphone recording a signal indicative of a potential damage event.

16. A damage detection method according to claim 11, wherein the step of measuring one or more properties of the surface using a sensor unit comprises at least partially illuminating the surface using at least one optical transmitter and recording the amount of light reflected by, or transmitted through, the surface using at least one optical detector.

17. A damage detection method according to claim 11, further comprising selecting the angle of incidence of light output by the optical transmitter(s) such that the light undergoes total internal reflection through the surface.

18. A damage detection method according to claim 11, including disposing an electrically conductive film on the surface and measuring the electrical resistance of the film.

* * * * *